UNITED STATES PATENT OFFICE.

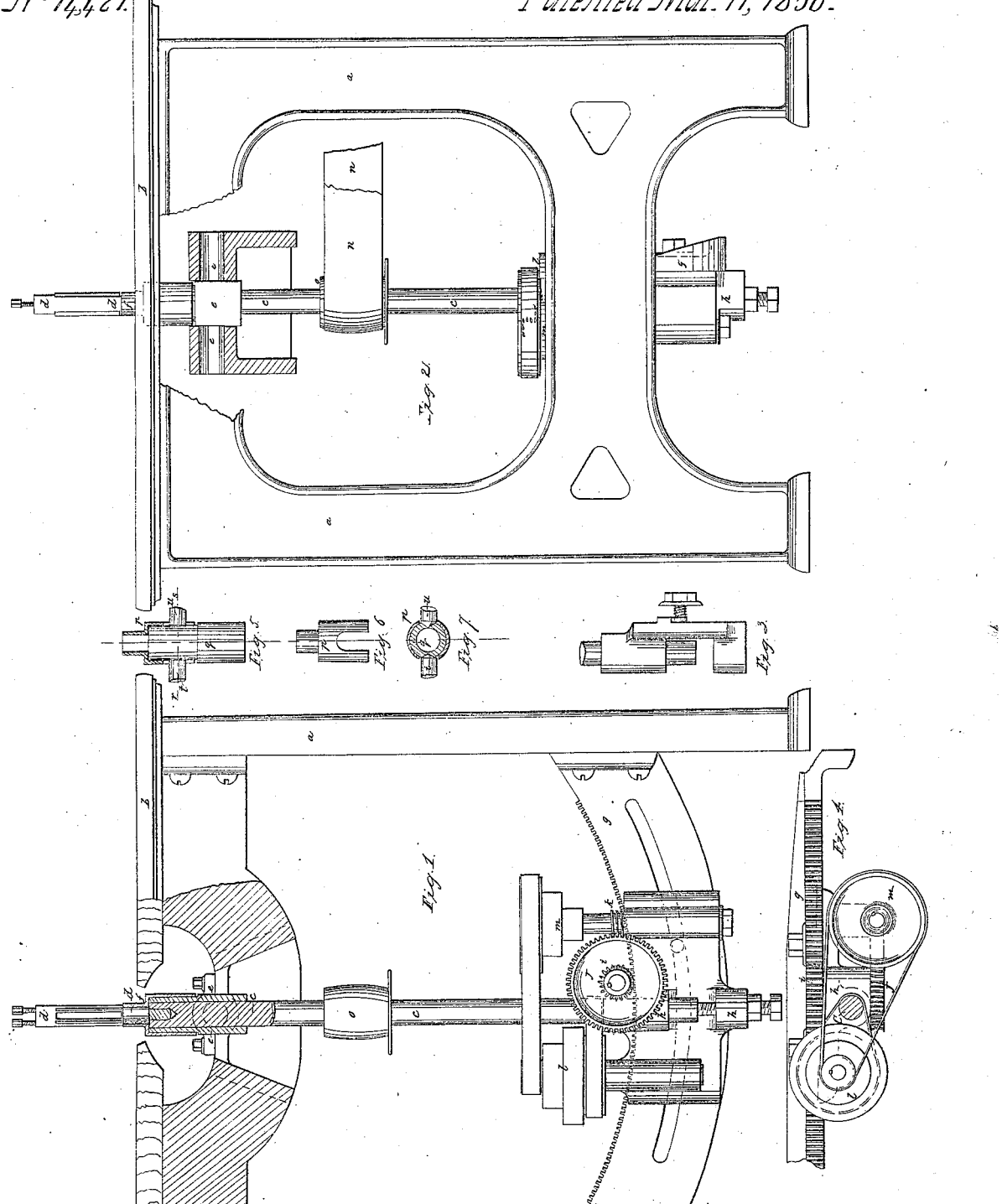

HENRY D. STOVER AND J. W. BICKNELL, OF BOSTON, MASSACHUSETTS.

MACHINE FOR CUTTING IRREGULAR FORMS.

Specification of Letters Patent No. 14,421, dated March 11, 1856.

*To all whom it may concern:*

Be it known that we, HENRY D. STOVER and JAMES W. BICKNELL, both of Boston, in the county of Suffolk and State of Massachusetts, have invented certain new and useful Improvements in Machines for Cutting Irregular Forms; and we do hereby declare that the following is a full, clear, and exact description of the construction and operation of the same, reference being had to the accompanying drawings, and to the letters of reference marked thereon, which drawings form a part of this specification and in which—

Figure 1, is a side elevation. Fig. 2 is an end elevation. Fig. 3, simply represents bearing (*h*) as it is constructed when it is designed to be moved by hand only. Fig. 4, is a plan of the bar (*g*) and the rack, the pinion (*i*) bearing (*h*) cones (*l*) and (*m*) wheel (J), &c. Fig. 5, represents a somewhat different method of securing the bearing for the upper end of the arbor from that shown in Figs. 1 and 2, the pivots (*t*) and (*u*) not being attached to the bearing but made pointed and those points being let into the bearing on opposite sides so as to alloy the bearing to turn freely upon them. Fig. 6, is a side view of the guide (*p*) corresponding to (*f*) in Fig. 1, and shows the slits in its sides to allow it to pass down by the pivots (*t*) and (*u*). Fig. 7, represents a section at line (*r*,) (*s*.)

Like letters indicate the same parts in all the figures. In Figs. 1, and 2, parts are represented as broken out so as to show parts beyond which are shown in section as see graining.

The frame is marked (*a*) and supports the table and other parts.

(*b*) is the table.

(*c*) is the arbor and (*d*) is the cutter head which is screwed into the arbor so that it may be removed therefrom to allow different heads to be used on the same arbor.

(*e*) is a bearing for the upper end of the arbor and rests in the frame upon journals or pivots so as to allow the arbor to stand at any angle in relation to the table at which it may be desirable to adjust it.

(*f*) is a guide fitted to the bearings (*e*) and so combined with the arbor and cutter head as to be raised and lowered with and by them (one or both of them). This guide does not rotate with the arbor or cutter head and therefore guides the pattern which carries the material to be cut without wearing it as the rotating cutter-head does when that is made the guide.

(*g*) is a bar which connects the two opposite sides of the frame and is curved to receive and support bearing (*h*).

(*h*) is a bearing for the lower end of the arbor and is secured to bar (*g*) in such a manner that it may slide back and forth in a circle concentric with the pivots or journals of bearing (*e*) so as to vary the angle of the arbor and cutters in relation to the table either gradually in the cutting process to cut spirally warped and other similar irregular surfaces or for adjustment at various fixed angles. Upon the upper side of bar (*g*) is a rack into which plays pinion (*i*). Pinion (*i*) worm-wheel (J) worm (*k*) and the cones of pulleys (*l*,) and (*m*) are all attached to the bearing (*h*) so as to retain their relative position to the arbor from which they derive their motion. A belt passes from the arbor to the cone of pulleys (*l*) another from thence to cone (*m*) connected to cone (*m*) by its shaft is a worm (*k*) which drives wheel (J), connected to (J) by its shaft is pinion (*i*) which plays into the stationary rack upon bar (*g*).

The speed is changed by changing the belt upon the two cones of pulleys. The step on which the lower end of the arbor rests is screwed so as thereby to adjust the height of the cutter head according to the various thicknesses of patterns used.

The driving belt is marked (*n*) and the pulley (*o*).

Small rolls may be set in the table to protrude slightly from its upper surface so as to reduce the friction in sliding (heavy timber) thereon and one or more of these rolls near to the cutters may have sharp teeth inserted in their periphery and be rotated by belt gears or a screw at speeds which may be variable at will so as to feed the timber along at any given speed proportional to the speed of the cutters' rotation.

Our improvements will adapt this class of machines to working ship timber and to many other valuable purposes to which they could not otherwise be profitably applied.

What we claim as our invention and desire to secure by Letters Patent is as follows:

1. Combining the guide (*f*) with the bearing (e) substantially as and for the purpose set forth and also combining the cutter head with this guide in such a manner that they shall move up and down together substantially as specified.

2. We also claim the combination of the cutter-head, arbor, and pivoted bearing (e), so as to allow the cutting angle of the knives to be varied in relation to the table substantially as set forth and also combining therewith the mechanism substantially as described for varying that angle gradually in the cutting process.

HENRY D. STOVER.
     J. W. BICKNELL.

Witnesses:
 HIRAM SANDS,
 C. P. LINDSAY.